US012689195B2

(12) United States Patent
Lawlor et al.

(10) Patent No.: US 12,689,195 B2
(45) Date of Patent: Jul. 21, 2026

(54) BUSWAY JOINT WITH A SECURING SYSTEM

(71) Applicant: Eaton Intelligent Power Limited, Dublin (IE)

(72) Inventors: Walter James Lawlor, Hodges, SC (US); Jonathan Edward Ulsaker, Anderson, SC (US); Taylor Nations, Simpsonville, SC (US)

(73) Assignee: Eaton Intelligent Power Limited, Dublin (IE)

( * ) Notice: Subject to any disclaimer, the term of this patent is extended or adjusted under 35 U.S.C. 154(b) by 262 days.

(21) Appl. No.: 18/374,769

(22) Filed: Sep. 29, 2023

(65) Prior Publication Data
US 2025/0112446 A1 Apr. 3, 2025

(51) Int. Cl.
*H02G 3/06* (2006.01)
*H01R 4/50* (2006.01)
*H02G 5/00* (2006.01)

(52) U.S. Cl.
CPC ................................. *H02G 3/0608* (2013.01)

(58) Field of Classification Search
CPC ...... H02G 3/0608; H02G 5/005; H02G 5/007; H01R 4/5008
See application file for complete search history.

(56) References Cited

U.S. PATENT DOCUMENTS

| | | | | | |
|---|---|---|---|---|---|
| 3,820,057 | A | * | 6/1974 | Joly ........................ | H02G 5/007 |
| | | | | | 174/88 B |
| 5,672,070 | A | * | 9/1997 | Weiss ................... | H01R 25/162 |
| | | | | | 439/213 |
| 2014/0141636 | A1 | | 5/2014 | O'Leary et al. | |
| 2021/0028607 | A1 | * | 1/2021 | Mruczek .............. | H02B 13/005 |

FOREIGN PATENT DOCUMENTS

| | | | | | |
|---|---|---|---|---|---|
| IT | 202000014110 | A1 | * | 12/2021 | ............. H02G 5/007 |
| WO | 2019201419 | A1 | | 10/2019 | |

OTHER PUBLICATIONS

Busway Systems Catalog, Schneider Electric, 5600CT9101R10/17, 2017, pp. 1-22.
(Continued)

*Primary Examiner* — Timothy J Thompson
*Assistant Examiner* — Amol H Patel
(74) *Attorney, Agent, or Firm* — DiBerardino McGovern IP Group LLC

(57) ABSTRACT
A busway joint includes a first base portion, a second base portion, and at least one electrically conductive assembly. The at least one electrically conductive assembly includes: a first electrical conductor; and a second electrical conductor separated from the first electrical conductor by a space. The busway joint also includes a securing assembly. The securing assembly includes: a connection element that couples the first base portion and the second base portion; a cam assembly at a first end of the connection element, the cam assembly including a cam body configured for rotation between a released position and a closed position; a locking element; and a spring element between the locking element and the second exterior side. Rotating the cam body between the released position and the closed position changes an extent of the space.

22 Claims, 7 Drawing Sheets

(56) References Cited

OTHER PUBLICATIONS

"Everything you need to know about today's most cost-effective technology for feeding power to electrical loads," Busway 101, Eaton Corporation, Publication No. WP017001EN / Z16720, Jun. 2015, 4 pages.

"Low-voltage power distribution and control systems> Busway > Low-voltage busway—Pow-R-Way III," Design Guide DG017002EN, Publication No. DG017002EN / Z23483, Feb. 2020, 53 pages.

Ruiz Ferrer, M, European Patent Office, Extended European Search Report in counterpart EP Patent Application No. 24203114.4, mailed Feb. 10, 2025, 15 pages total.

* cited by examiner

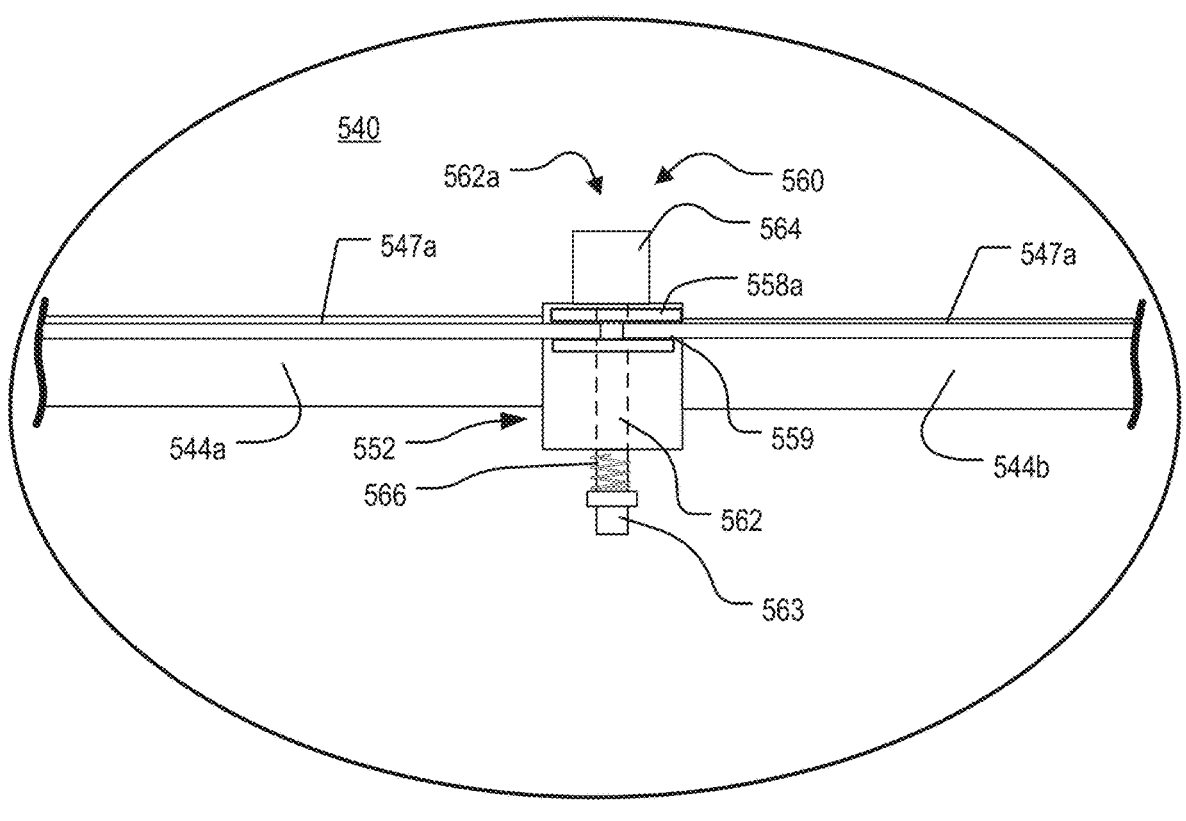
FIG. 5
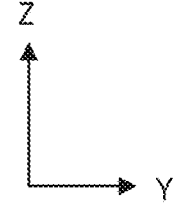

BUSWAY JOINT WITH A SECURING SYSTEM

TECHNICAL FIELD

This disclosure relates to a busway joint with a securing system.

BACKGROUND

Electrical power may be distributed throughout a building via cable and conduit. A busway system is an alternative to the traditional cable and conduit.

SUMMARY

In one aspect, a busway joint includes a first base portion and a second base portion. The first base portion includes: a first exterior side, and a first interior side; and the second base portion includes: a second exterior side, and a second interior side that faces the first interior side. The busway joint also includes at least one electrically conductive assembly between the first interior side and the second interior side. The at least one electrically conductive assembly includes: a first electrical conductor; and a second electrical conductor separated from the first electrical conductor by a space. The busway joint also includes a securing assembly that includes: a connection element that couples the first base portion and the second base portion; a cam assembly at a first end of the connection element, the cam assembly including a cam body configured for rotation between a released position and a closed position; a locking element; and a spring element between the locking element and the second exterior side. Rotating the cam body between the released position and the closed position changes an extent of the space.

Implementations may include one or more of the following features.

The connection element may include a bolt, and the bold may include a bolt head and a bolt body that extends from the bolt head. The cam body may be attached to the bolt head at a rotation mount, the bolt body may extend through the busway joint, and the locking element and the spring element may be mounted on the bolt body. The busway joint also may include: a first washer between the cam body and the first exterior side; and a second washer between the spring element and the second exterior side. The first washer may be a first deflectable disk washer, and the second washer may be a second deflectable disk washer. The cam body may include a curved perimeter portion configured to contact and deform the first deflectable washer when the cam body rotates between the released position and the closed position.

Rotating the cam body from the released position to the closed position may compress the spring element and may reduce the extent of the space; and rotating the cam body from the closed position to the released position may allow the spring element to expand and may increase the extent of the space.

The spring element may include a coil spring that surrounds the connection element.

The cam assembly also may include an operating interface attached to the cam body, and the cam body may be configured to rotate between the released position and the closed position in response to manipulation of the operating interface. The operating interface may be a handle that is configured for manual manipulation without the use of tools.

In another aspect, a system includes: a busway portion including: a busway housing that has a first end and a second end; and one or more busway electrical conductors mounted to the busway housing, each of the busway electrical conductors extending from the first end of the busway housing and from the second end of the busway housing. The system also includes a busway joint including: a first base portion including: a first exterior side, and a first interior side; a second base portion including: a second exterior side, and a second interior side that faces the first interior side; at least one electrically conductive assembly including: a first joint electrical conductor; and a second joint electrical conductor separated from the first joint electrical conductor by a space, the space being configured to receive one of the one or more electrical conductors; and a securing assembly including: a connection element that passes through the busway joint; a cam assembly at a first end of the connection element, the cam assembly including a cam body configured for rotation between a released position and a closed position; a locking element at a second end of the connection element; and a spring element between the locking element and the second exterior side. Rotating the cam body between the released position and the closed position changes an extent of the space.

Implementations may include one or more of the following features.

The connection element of the busway joint may be a bolt, and the bolt may include a bolt head and a bolt body that extends from the bolt head. The cam body may be attached to the bolt head at a rotation mount, the bolt body may extend through the busway joint, and the locking element and the spring element may be mounted on the bolt body.

The busway joint also may include: a first washer between the cam body and the first exterior side; and a second washer between the spring element and the second exterior side.

Rotating the cam body from the released position to the closed position may compress the spring element and reduce the extent of the space; and rotating the cam body from the closed position to the released position may allow the spring element to expand and increase the extent of the space.

The cam assembly also may include an operating interface attached to the cam body. The cam body may be configured to rotate between the released position and the closed position in response to manipulation of the operating interface.

In another aspect, a securing system for a busway joint includes: a bolt including: a bolt head; and a bolt body that extends from the bolt head, the bolt body including a smooth exterior portion and a threaded end, the bolt body configured for insertion through a busway joint; a cam assembly including: a cam body mounted to the bolt head; and an operating interface on the cam body, the operating interface configured to rotate the cam body to apply a force to a first exterior side of the busway joint; a spring element configured for mounting onto the smooth exterior portion of the bolt body; and a locking element configured for connection to the threaded end of the bolt body with the spring element between the locking element and a second exterior side of the busway joint.

Implementations may include one or more of the following features.

The cam body may include a curved perimeter portion.

The cam body may include two identical lobes and the operating interface may be a handle connected to the two identical lobes, the bolt body may be centered between the two identical lobes, and the handle may be configured to be rotated by hand and without the use of tools. Each identical lobe may have a curved perimeter portion.

The spring element includes a coil spring that surrounds the smooth exterior portion of the bolt body.

The locking interface may include a locking nut attached to the threaded end of the bolt body.

Implementations of any of the techniques described herein may include an apparatus, a device, a system, a busway joint, a busway system, a kit for retrofitting an existing busway joint, a securing system for a busway joint, and/or a method. The details of one or more implementations are set forth in the accompanying drawings and the description below. Other features will be apparent from the description and drawings, and from the claims.

DRAWING DESCRIPTION

FIG. 5 shows a partial cross-sectional view of an assembled busway system.

DETAILED DESCRIPTION

Figure 1:
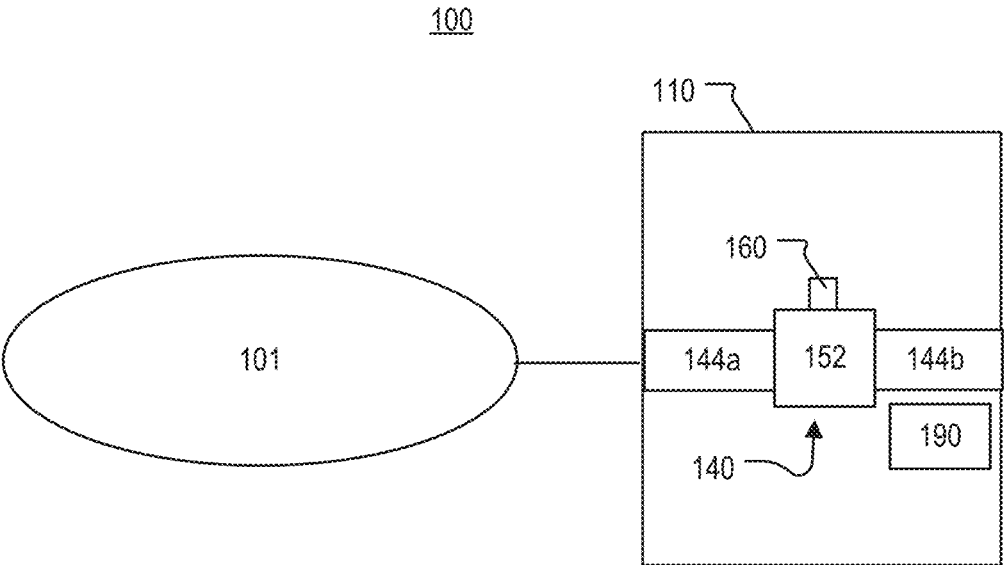
FIG. 1 is a block diagram of a system.

FIG. 1 is a block diagram of a system 100 that includes a facility 110 that receives electrical power from and/or provides electrical power to a power grid 101. Within the facility 110, electrical power is distributed to one or more power consuming and/or power generating devices 190 by a busway system 140. The busway system 140 includes busway portions 144a, 144b that are electrically and mechanically connected by a busway joint 152.

Busway systems may be used to distribute electrical power throughout a facility 110 instead of or in addition to a traditional cable and conduit power distribution system. The busway system 140 has a configuration and size that is appropriate for the facility 110. For example, the busway system 140 may be configured to distribute electrical power having an RMS voltage of 600 volts (V) or less and currents of up to 600 amperes (A). Furthermore, the modular nature of the busway system 140 allows the owner, operator, or other entity to reconfigure the busway system 140 as appropriate.

As discussed in greater detail below, the busway joint 152 includes a securing assembly 160 that improves the performance and usability of the busway system 140. For example, the securing assembly 160 includes a spring loaded mechanism that applies a clamping force that securely holds the busway portions 144a, 144b in electrical and mechanical contact during use and diminishes the likelihood of the busway joint 152 loosening over time. The securing assembly 160 also includes a cam assembly that applies a clamping force and enables the busway joint 152 to be installed and removed without the use of tools.

An overview of the system 100 is provided prior to discussing the busway joint 152 in more detail.

The facility 110 is any structure or area in which the busway system 140 is installed to provide electrical power to one or more of the devices 190. For example, the facility 110 may be a hospital, an office or apartment building, a retail establishment, a high rise, a factory, or a data center. The facility 110 may be a region or area that is not necessarily enclosed in a building or an area that is partially exposed. For example, the facility 110 may be a construction site or a temporary structure. The device 190 may be any device or system that consumes and/or generates electrical power. Specific examples of the device 190 include, without limitation, computing equipment, industrial machinery and equipment, generators, power converters, medical equipment, and lighting systems.

The power grid 101 distributes electrical power to commercial, residential, industrial, and/or municipal facilities. The power grid 101 is an alternating current (AC) power grid with a fundamental frequency of, for example, 50 or 60 Hertz (Hz). The power grid 101 may be a multi-phase (for example, three-phase) power grid. The power grid 101 may be low-voltage (for example, up to 1 kilovolt (kV)), medium-voltage or distribution voltage (for example, between 1 kilovolts (kV) and 35 kV), or high-voltage (for example, 35 kV and greater). The power grid 101 may include more than one sub-grid or portion. For example, the power grid 101 may include AC micro-grids, AC area networks, or AC spot networks that serve particular customers. These sub-grids may be connected to each other via switches and/or other devices to form the power grid 101. Moreover, sub-grids within the grid 101 may have different nominal voltages. For example, the power grid 101 may include a medium-voltage portion connected to a low-voltage portion through a distribution transformer.

The power grid 101 includes devices that generate, consume, transfer, distribute, and/or absorb electrical energy. The power grid 101 may include sources of electrical energy such as, for example, power plants, power generators, renewable energy sources, power stations, and/or one or more distributed energy resources (DER). A DER is an electricity-producing resource and/or a controllable load. Examples of DER include solar-based energy sources such as, for example, solar panels and solar arrays; wind-based energy sources, such as, for example, wind turbines and windmills; combined heat and power plants; rechargeable sources (such as batteries); natural gas-fueled generators; electric vehicles; and controllable loads, such as, for example, some heating, ventilation, air conditioning (HVAC) systems and electric water heaters.

The power grid 101 also may include one or more reclosers or switchgears, sectionalizers, transformers, and a point of common coupling (PCC) that provides an AC bus for more than one discrete load. The power grid 101 also includes transport media, such as, for example, transmission lines and electrical cables. All or part of the power grid 101 may be underground.

Figure 2:
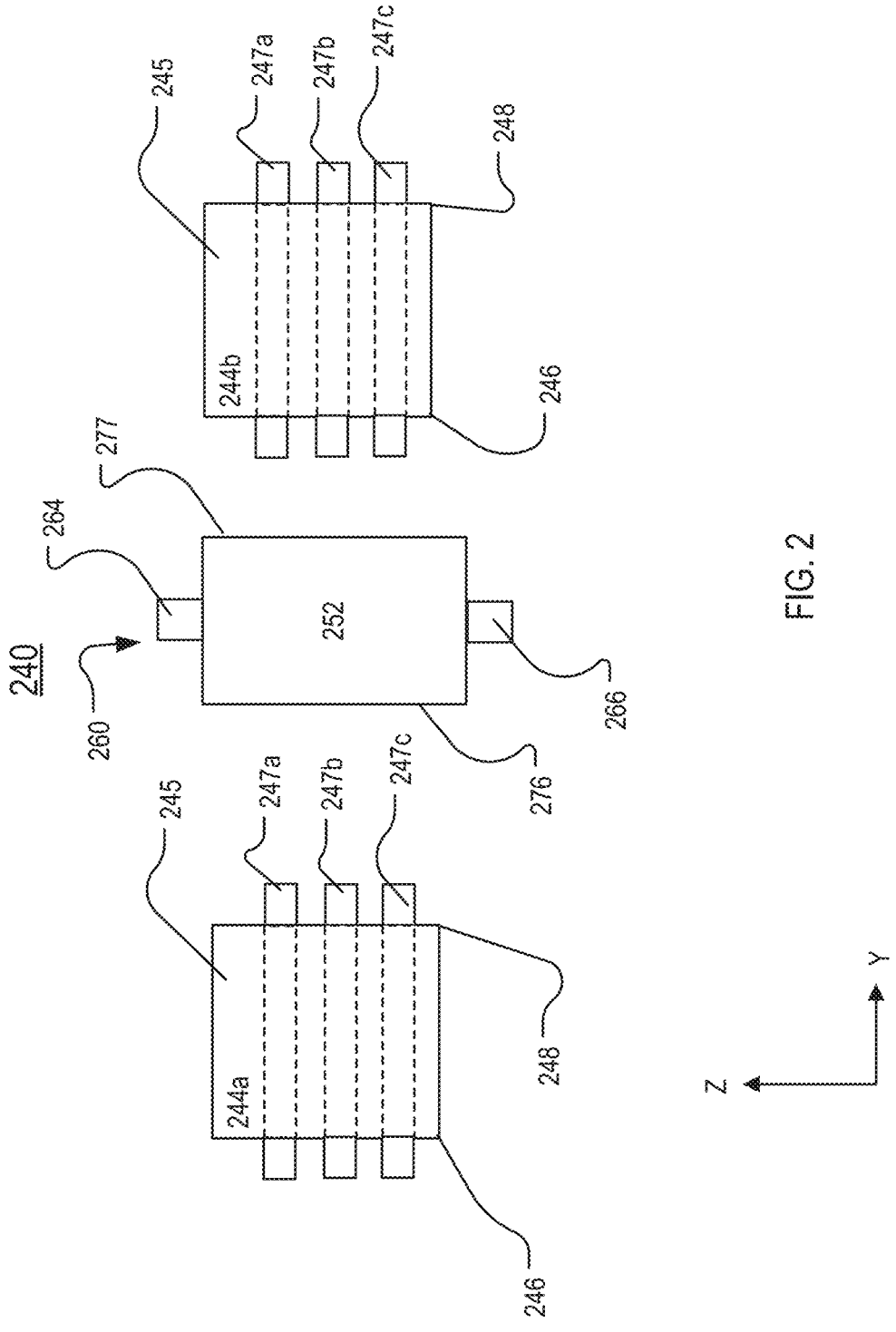
FIG. 2 is a side exterior block diagram of a busway system in a disassembled or uninstalled state.

FIG. 2 is a side exterior block diagram of a busway system 240 in a disassembled or uninstalled state. The busway system 240 includes busway portions 244a, 244b and a busway joint 252 configured to electrically and mechanically join the busway portions 244a, 244b. The busway portions 244a, 244b are examples of the busway portions 154a, 154b of FIG. 1, and the busway joint 252 is an example of the busway joint 152 of FIG. 1.

The busway portion 244a includes a busway housing 245 and busway electrical conductors 247a, 247b, 247c mounted to the busway housing 245. The busway housing 245 may be any support or structure that is capable of supporting the busway electrical conductors 247a, 247b, 247c. The busway housing 245 is not necessarily an enclosure. For example, the busway housing 245 may be a beam. The busway housing 245 is made of any durable and rigid material, such as, for example, aluminum. The busway electrical conductors 247a, 247b, 247c are made of a material that conducts electricity, such as, for example, copper, gold, aluminum, or a metal alloy. The busway electrical conductors 247a, 247b, 247c may be, for example, busbars. The busway electrical conductors 247a, 247b, 247c are electrically isolated from each other. For example, each busway electrical conductor 247a, 247b, 247c may be coated with an electrically insulating material such as, for example, epoxy. Other insulators that are not necessarily coatings may provide electrical isolation by being placed between the busway conductors 247a, 247b, 247c.

The busway housing 245 extends along the Y axis from a first end 246 to a second end 248. The busway electrical conductors 247a, 247b, 247c extend through the busway housing 245 in the Y direction and also extend from the first end 246 and the second end 248. In other words, the ends of the busway electrical conductors 247a, 247b, 247c are accessible from the exterior of the busway housing 245. In the example shown in FIG. 2, the busway housing 245 is a housing, and the portions of the busway electrical conductors 247a, 247b, 247c that are enclosed in the busway housing 245 are shown with dashed lines. The busway electrical conductors 247a, 247b, 247c are separated from each other in the Z direction and are not in electrical contact with each other. The busway housing 245 and the busway electrical conductors 247a, 247b, 247c are three-dimensional objects and also extend in the X direction.

The busway portion 244b is configured in the same manner. The busway portions 244a, 244b may be configured in other ways and may include additional components not shown in FIG. 2. For example, each busway portion 244a, 244b may include grounding plates or grounding paths, with one grounding path or plate being above the conductor 247a and another grounding path or plate being below the conductor 247c. The busway portions 244a, 244b may include more or fewer than three busway electrical conductors. The busway portions 244a, 244b also may include ground path surface contacts, ground path end blocks, insulation, joint covers, and/or other elements mounted on or in the structure 247.

The busway joint 252 includes a securing mechanism 260 that includes a cam assembly 264 and a spring element 266. To assemble or install the busway system 240, the cam assembly 264 is placed in the released position, the busway portion 244a is inserted into a side 276 of the busway joint 252, and the busway portion 244b is inserted into a side 277 of the busway joint 252. The cam assembly 264 is manipulated to the closed position to apply pressure on the joint 252 in the −Z direction, which also compresses the spring element 266. The compressed spring element 266 exerts a force on the joint 252 in the Z direction. These clamping forces hold the conductors 247a, 247b, 247c of the busway portions 244a, 244b in the joint 252 and ensure a secure electrical contact between each conductor 247a, 247b, 247c of the busway portion 244a with the respective conductor 247a, 247b, 247c of the busway portion 244b.

The busway joint 252 may be removed from the busway system 240 to be replaced or repaired. The busway joint 252 may be disconnected from the busway portions 244a, 244b by manipulating the cam assembly 264 to the released position, which loosens the clamping force on the joint 252. Intentionally loosening the joint 252 in this manner allows the busway portion 244a to be removed from the side 276 of the joint 252 and the busway portion 244b to be removed from the side 277 of the joint 252. The cam assembly 264 is configured to be manipulated manually and without the use of tools. For example, a technician can install or remove the joint 252 with a single hand or with two hands and without the use of tools such as wrenches or pliers.

Although the cam assembly 264 may be manipulated without the use of tools, in some implementations, a handle or extension piece is provided with the busway joint 252 to facilitate manipulation of the cam assembly 264. The extension piece may be, for example, a metal handle that is 2 to 24 inches in length. In implementations in which the extension piece is provided, the extension piece provides the user or maintenance personnel with additional leverage to move the cam assembly 264.

Figure 3A:
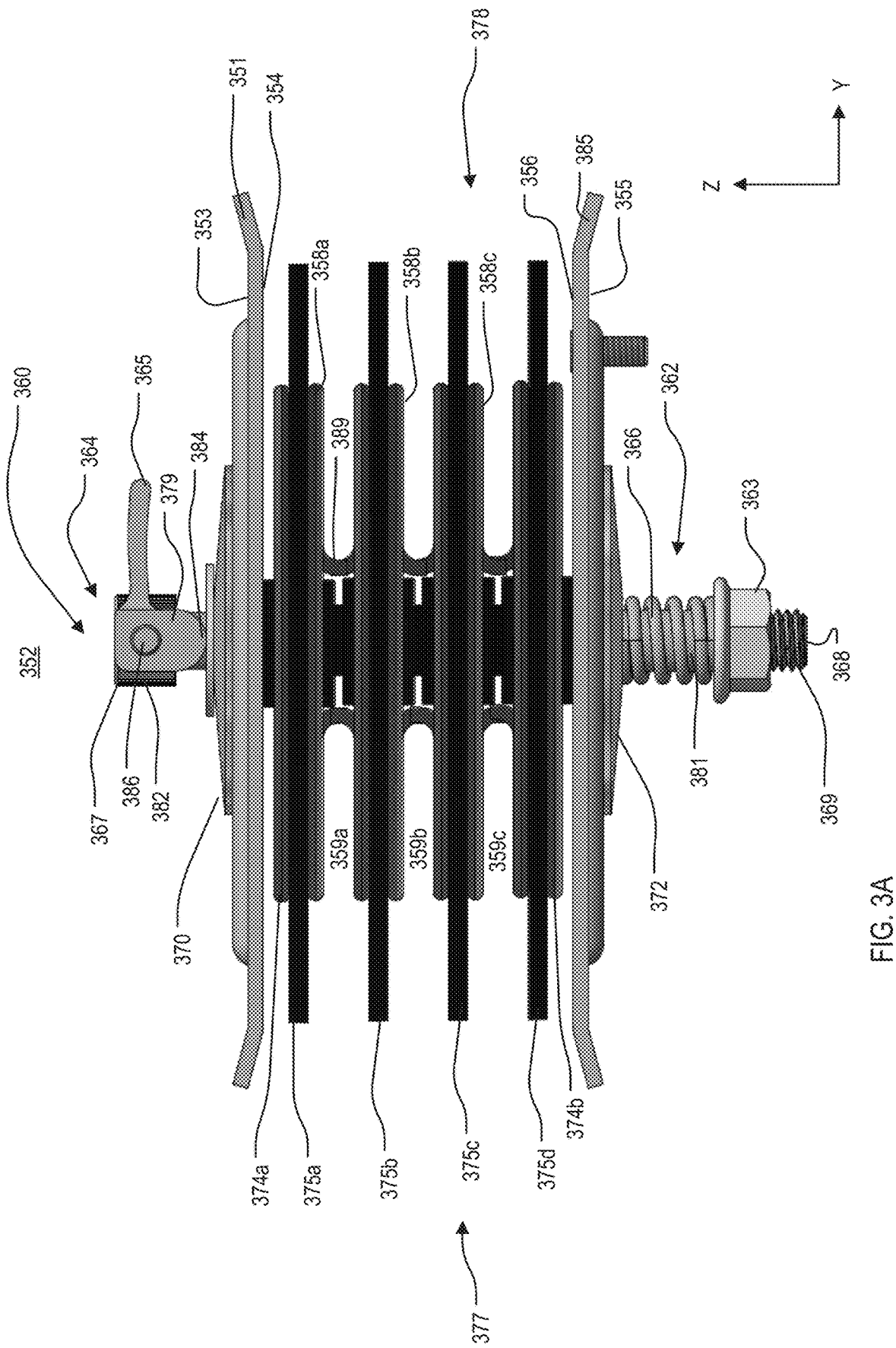
FIG. 3A is a cross-sectional view of a busway joint in a closed position.
Figure 3B:
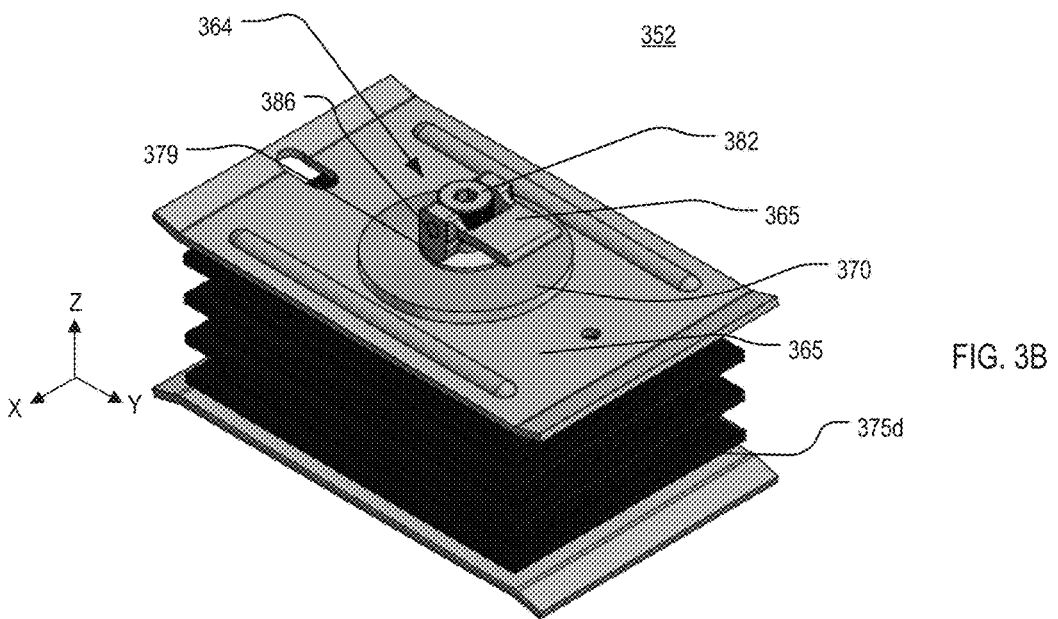
FIG. 3B is a top perspective exterior view of the busway joint of FIG. 3A.
Figure 3C:
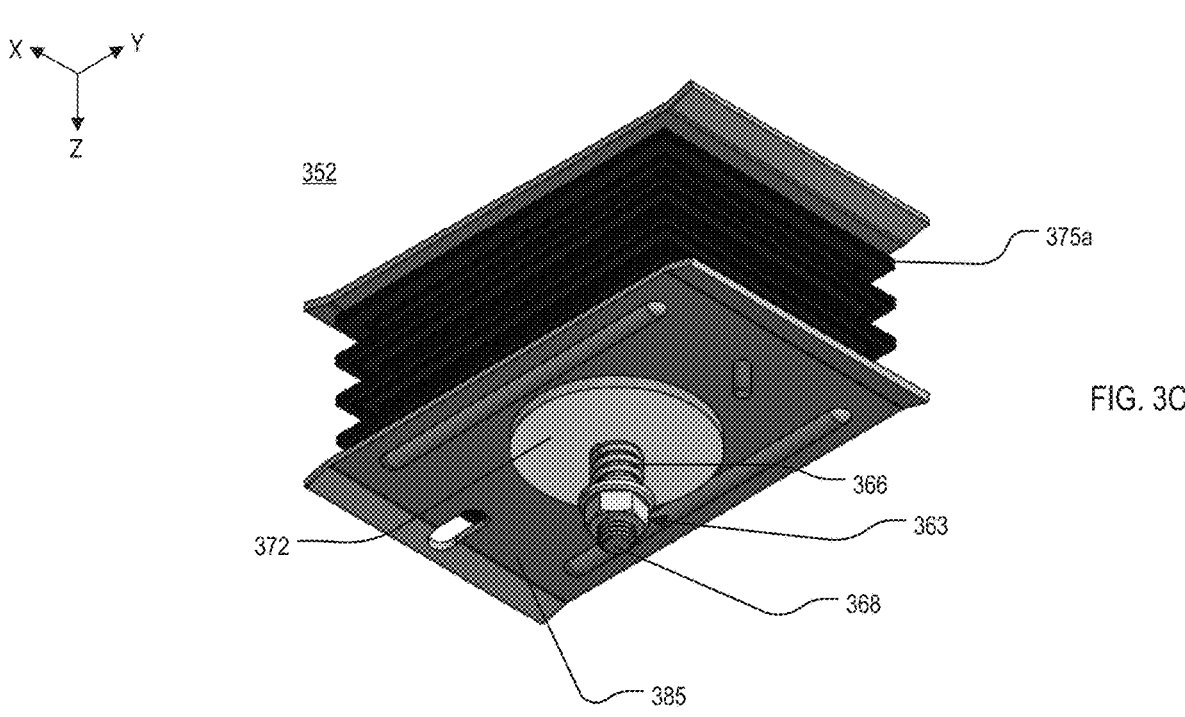
FIG. 3C is a bottom perspective exterior view of the busway joint of FIG. 3A.

FIG. 3A is a cross-sectional view of a busway joint 352 in the Y-Z plane. FIG. 3B is a top perspective exterior view of the busway joint 352. FIG. 3C is a bottom perspective exterior view of the busway joint 352. The busway joint 352 is configured to electrically and mechanically connect to at least one busway portion.

The busway joint 352 includes a first base portion 351 and a second base portion 385. The first base portion 351 and the second base portion 385 may be plates that extend generally in the X-Y plane. The base portions 351 and 385 may be bridge joint pressure plates. The first base portion 351 has an exterior side 353 (also referred to as the first exterior side 353) and an interior side 354 (also referred to as the first exterior side 354). The second base portion 385 has an exterior side 355 (also referred to as the second exterior side 355) and an interior side 356 (also referred to as the second exterior side 356). The first interior side 354 faces the second interior side 356.

The busway joint 352 also includes electrically conductive assemblies 358a, 358b, 358c between the first interior side 354 and the second interior side 356. Each electrically conductive assembly 358a, 358b, 358c defines a respective space 359a, 359b, 359c. Each space 359a, 359b, 359c is open at a first side 377 of the joint 352 and at a second side 378 of the joint 352. For example, a first busway conductor may be inserted into the space 359a in the Y direction through the side 377 and a second busway conductor may be inserted into the space 359a in the −Y direction through the side 378. When the joint 352 is in the closed position, the first and second busway conductors are electrically connected by the conductive assembly 358a.

Other implementations are possible. For example, the electrically conductive assemblies 358a, 358b, 358c may be configured such that a busway conductor can be inserted into the joint 352 in the X direction or −X direction.

Each electrically conductive assembly 358a, 358b, 358c includes two electrically conductive plates that extend generally in the X-Y plane and a stopping tab 389 between the two plates. The stopping tabs provide stopping points or barriers that prevent inserted busways from extending too far into the spaces 359a, 359b, 359c. Only one stopping tab 389 is labeled in FIG. 3A. The electrically conductive assemblies 358a, 358b, 358c are made of an electrically conductive material, such as, for example, copper. The busway joint 352 also includes electrically conductive grounding plates 374a and 374b.

The electrically conductive assemblies 358a, 358b, 358c are arranged along the Z direction with the electrically conductive assembly 358a positioned closest to the first base portion 351, the electrically conductive assembly 358c positioned closest to the second base portion 385, and the electrically conductive assembly 358c between the electrically conductive assembly 358a and 358c. The grounding plate 374a is between the electrically conductive assembly 358a and the first interior side 354. The grounding plate 374b is between the electrically conductive assembly 358c and the second interior side 356.

The grounding plates 374a, 374b and the electrically conductive assemblies 358a, 358b, 358c are electrically isolated from each other. In the example shown in FIG. 3A, an electrically insulating barrier 375a is between the grounding plate 374a and the conductive assembly 358a, an electrically insulating barrier 375b is between the conductive assemblies 358a and 358b, an electrically insulating barrier 375c is between the conductive assemblies 358b and 358c, and an electrically insulating barrier 375d is between the conductive assembly 358c and the grounding plate 374b. The insulating barriers 375a, 375b, 375c, 375d have a greater extent in the X-Y than the electrically conductive assemblies 358a, 358b, 358c such that the insulating barriers 375a, 375b, 375c, and 375d also provide electrical insulation between busway electrical conductors that are received in the electrically conductive assemblies 358a, 358b, 358c.

The insulating barriers 375a, 375b, 375c, 375d may be any type of electrical insulation. For example, each insulation barrier 375a, 375b, 375c, 375d may be a sheet or plate of an electrically insulating material, such as, for example, ceramic, fiberglass, foam, rubber, glass polyester, or a combination of such materials.

The busway joint 352 also includes a securing assembly 360. The securing assembly 360 includes a connection element 362 (also shown in FIG. 3D) that couples the first base portion 351 and the second base portion 351. The connection element 362 extends in the Z direction from an end 368 to an end 367. The connection element 362 includes a rod or shaft body 381 that extends through the busway joint 352 along the Z axis. The body 381 may be made of an electrically conductive material. In these implementations, the body 381 includes or is covered by an electrically insulating material, such as an electrically insulating sleeve or an electrically insulating coating. The electrically insulating material prevents the body 381 from causing electrical shorting when the securing assembly 360 is inside the busway joint 352.

The connection element 362 also includes a bolt head 382 at the end 367. The bolt head 382 includes a rotation mount 387 and a recessed feature 388. The recessed feature 388 may receive a hand tool, such as a hex-wrench. The end 368 has exterior threads 369 that extend to a shelf 391. The connection element 362 may be a shoulder bolt in which the exterior of the body 381 is smooth (lacks threading) between the shelf 391 and the bolt head 382.

Referring again to FIG. 3A, the securing assembly 360 also includes a locking element 363 and a spring element 366 between the locking element 363 and the second exterior side 355. In the example shown, the locking element 363 is a nut that is secured against the shelf 391. The spring element 366 surrounds the body 381. The spring element 366 may be any type of element that has a stable compressed state and a stable relaxed state and may be transitioned between these states. In the example shown in FIG. 3A, the spring element 366 is a coil spring.

The busway joint 352 also includes a first washer 370 between the cam body 379 and the first exterior side 353, and a second washer 372 between the spring element 366 and the second exterior side 355. The washers 370, 372 may be deflectable disc washers or Belleville washers. The first washer 370 and the second washer 372 are convex shaped when uncompressed and flat when compressed.

The securing assembly 360 also includes a cam assembly 364 mounted to the end 367. The cam assembly 364 includes a cam body 379 and an operating interface 365 that is attached to the cam body 379. The cam body 379 includes a curved perimeter region 384. The cam body 379 and operating interface 365 may be made of any strong and resilient material. For example, the cam body 379 may be made of steel.

As discussed in more detail below, by manipulating the operating interface 365, the cam body 379 can be rotated between a closed position (shown in FIG. 3A) and a released position (shown in FIG. 4).

Figure 3D:
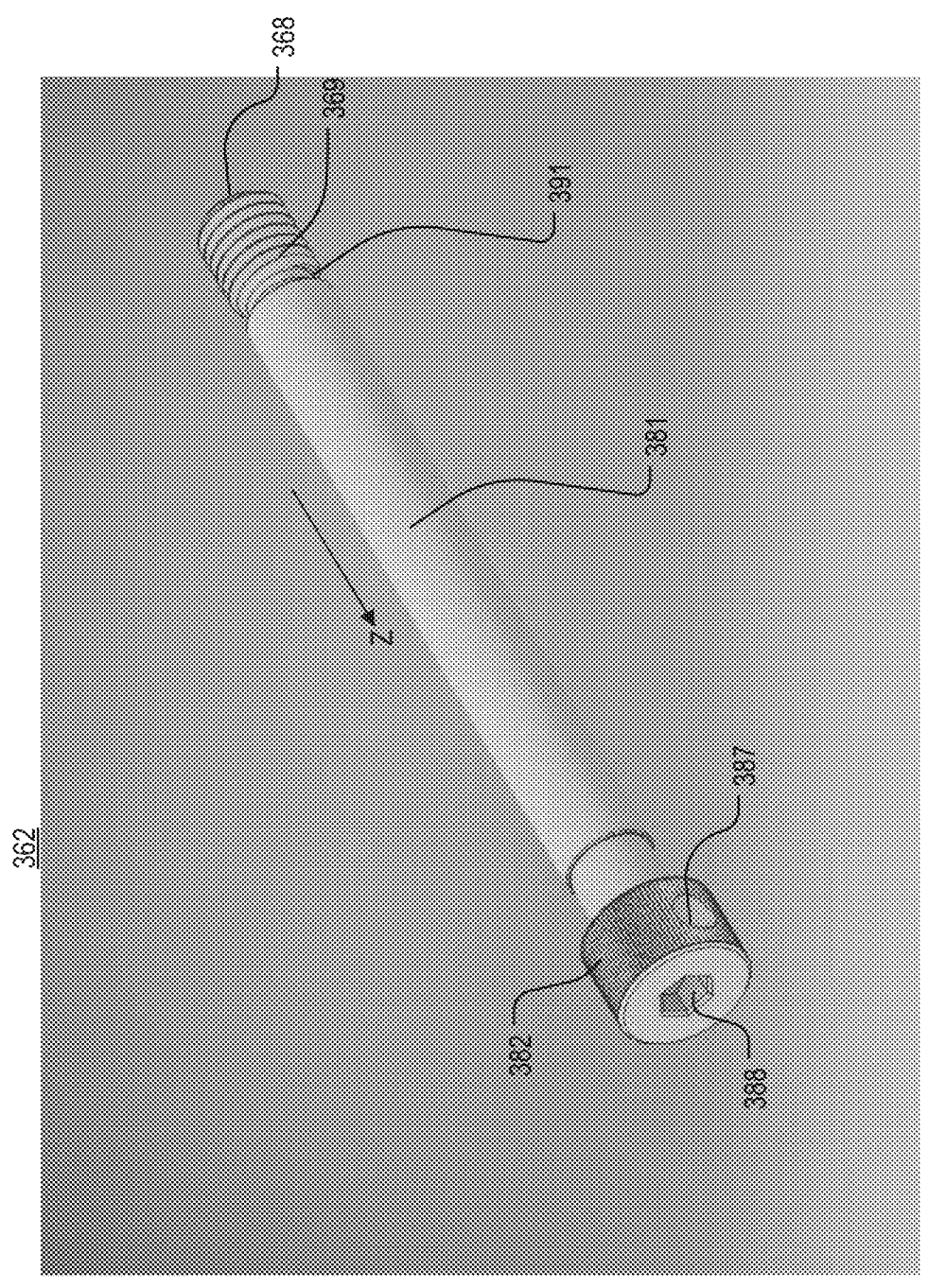
FIG. 3D is a perspective exterior view of a connection element.

The cam assembly 364 is attached to the bolt head 382 with a securing pin or bolt 386. The securing pin 386 attaches to the rotation mount 387. In the example of FIG. 3D, the rotation mount 387 is an opening that passes through bolt head 382. The cam body 379 also includes openings. To mount the cam assembly 364 to the connection element 362, openings (not shown) in the cam body 379 are aligned with the rotation mount 387 and the securing pin 386 is inserted into the rotation mount 387 and the aligned cam openings. The cam body 379 is able to rotate about the pin 386 after being mounted on the connection element 362.

Referring also to FIG. 3B, the cam body 379 is a two-sided or two-lobed cam body that includes two identical lobes with the profile of the cam body 379 in the X-Y plane on either side of the operating interface 365. The bolt head 382 is centered in the first base portion 351 and body 381 passes through the center of the joint 352 along the Z axis. The operating interface 365 is centered on the bolt head 382, and the two sides of the cam body 379 are positioned symmetrically about the bolt head 382. Using the two-sided cam body 379 positioned in this manner results in the cam body 379 applying a force that is the same on both sides of the bolt head 382 and may improve the function of the joint 352 by improving the electrical contact between the joint 352 and inserted busway conductors. However, other implementations are possible. For example, a single-sided cam body may be used in the cam assembly 364.

Figure 4:
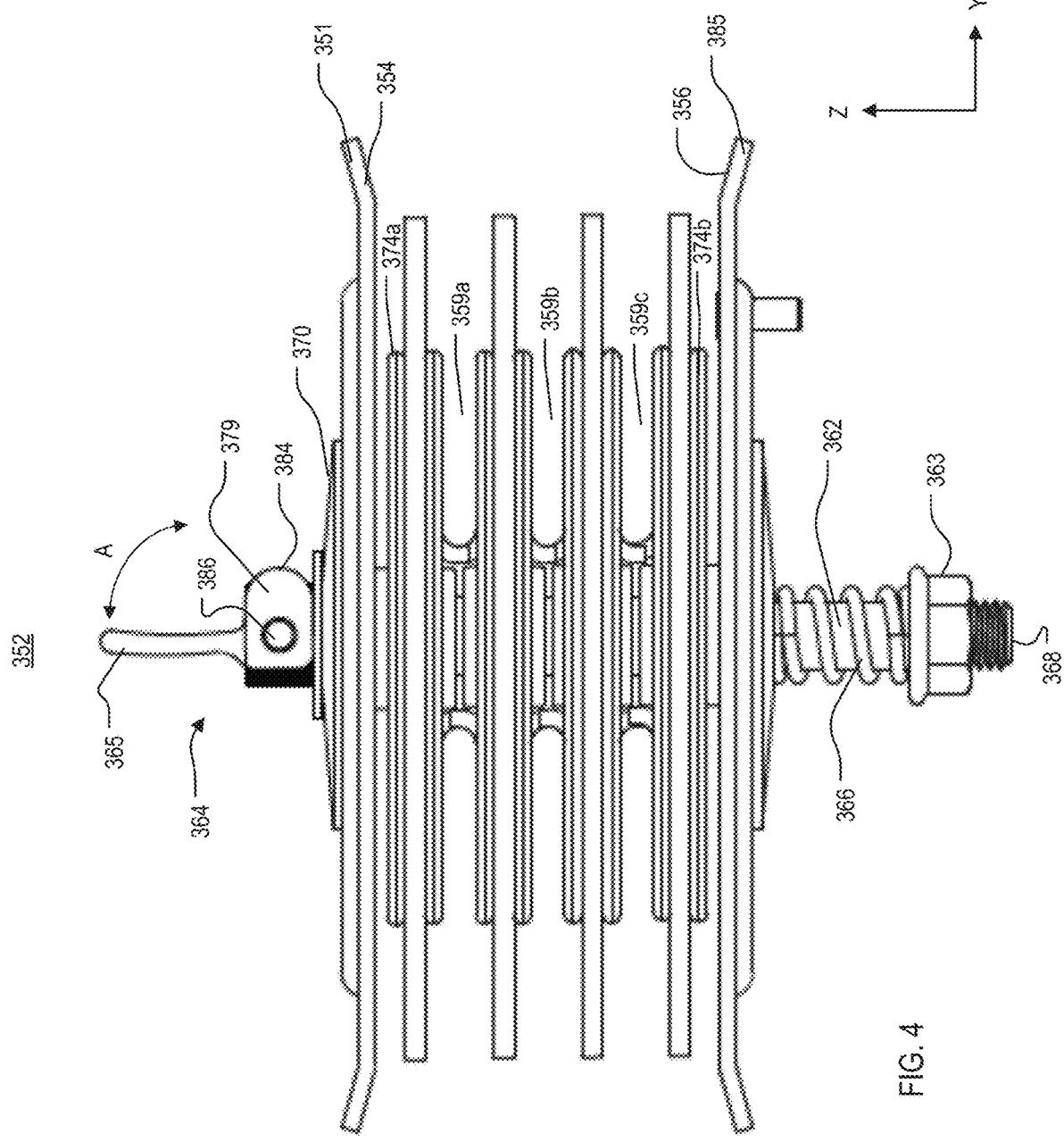
FIG. 4 is a cross-sectional view of the busway joint of FIG. 3A in a released position.

FIG. 4 is a cross-sectional view of the busway joint 352 in the Y-Z plane with the cam assembly 364 in the released position. The installation of the busway joint 352 is discussed with respect to FIG. 4, which shows the busway joint 352 with the cam assembly 364 in the released position, and FIG. 3A, which shows the busway joint 352 with the cam assembly in the closed position.

In the released position, the cam body 379 may touch the first washer 370 but the curved perimeter region 384 is not in contact with the first washer 370. To transition the cam assembly 364 from the released position to the closed position, force is applied to the interface 365 such that the interface 365 moves clockwise along an arc A, rotating the cam body 379 about the pin 386. The cam assembly 364 is configured such that a human operator can move the interface 365 along the arc A with their hands and without the use of a tool such as a wrench. For example, the interface 365 may be a smooth metal handle that is easily graspable and easily rotated along the arc A by most humans.

In some implementations, an additional handle or extension piece may be used to articulate the interface 365 along the arc A. The extension piece may slide over the interface 365 or otherwise attach to the interface 365. The extension piece is optional but may provide additional leverage, for example, to aid in articulating the interface 365 on relatively large implementations of the joint 352. A large implementation of the joint 352 may be one in which the surface area of the base portions 351 and 385 is relatively large in the X-Y plane or the extent of the base portions 351 or 385 is relatively large in the X or Y direction. The spring force that the spring element 366 provides when compressed is determined based on characteristics of the spring element 366. As compared to a smaller joint 352, a joint 352 with a larger extent in the X or Y direction or a larger surface area in the X-Y plane uses a spring element 366 that applies a higher spring force. This larger spring force also may make it more challenging to actuate the interface 366 on a larger implementation of the joint 352. The optional extension piece helps to address this challenge.

The cam body 379 rotates in the clockwise direction with the interface 365, and the curved perimeter region 384 of the cam body 379 comes into contact with the first washer 370 and begins to press the first washer 370 in the −Z direction and apply force in the −Z direction on the first base portion 351. The interface 365 continues to rotate about the arc A until reaching the position shown in FIG. 3. The curved perimeter region 384 exerts force in the −Z direction, moving the base portions 351 and 385 along the smooth portion of the body 381 of the connection element 362 toward the end 368 and flattening the washers 370 and 372. The locking element 363 does not move. Thus, moving the base portions 351 and 385 toward the end 368 compresses the spring element 366 against the locking element 363. The compressed spring element 366 exerts a force on the base portion 385 in the Z direction.

The combined forces from the cam body 379 and the spring element 366 (and the washers 370 and 372) cause the spaces 359a, 359b, 359c to have a reduced extent along the Z direction. The space between the first interior side 354 and the grounding plate 374a and the space between the second interior side 356 and the grounding plate 374b are also reduced.

Because the extent of the spaces 359a, 359b, 359c is reduced in the Z direction, the respective electrically conductive assemblies 358a, 358b, 358c clamp onto the inserted busway conductors (not shown) more securely and create a more reliable and stable electrical connection than a joint that does not include the cam assembly 364 and spring element 366 such that the joint 352 improves the electrical connection in a busway system that includes the joint 352.

Moreover, although the first washer 370 and/or the second washer 372 provide forces that are complementary to the force applied by the cam body 379 and the spring element 366, the busway joint 352 may be used without the washer 370 and/or the washer 372. The clamping force of the cam body 379 and the spring element 366 may result in a force of about 50-60 pounds being placed on the busway joint 352 in the closed position.

To transition the cam assembly 364 from the closed position (FIG. 3A) to the released position (FIG. 4), the interface 365 is rotated along the arc A in the counterclockwise direction. The curved perimeter region 384 of the cam body 379 rotates off of the washer 370, and the spring element 366 expands, increasing the extent of the spaces 359a, 359b, 359c in the Z direction. This larger spacing can allow for the bus joint 352 to be more easily installed or removed.

FIG. 5 shows a partial cross-sectional view of an assembled busway system 540. The busway system 540 includes a first busway portion 544a, a second busway portion 544b, and a busway joint 552 that joins the portions 544a and 544b. Each busway portion 544a, 544b includes one or more busway electrical conductors. In the example shown, the busway portion 544a includes a busway conductor 547a and the busway portion 544b includes a busway conductor 547b.

The busway joint 552 includes an electrically conductive assembly 558a that includes two electrically conductive plates and a space 559 between the electrically conductive plates. The busway conductors 547a and 547b are in the space 559. The busway joint 552 also includes a securing assembly 560. The securing assembly includes a connection element 562, a cam assembly 564, a locking element 563, and a spring element 566. The busway joint 522 operates in a manner similar to the busway joint 352. That is, when the cam assembly 564 is in the closed position, the cam 564 and the spring element 566 apply compressive force on the joint 552 and the electrically conductive assembly 558 holds the busway conductors 547a and 547b securely. When the cam assembly 564 is in the released position, the force is released and the busway conductors 547a and 547b may be removed from the joint 552.

These and other implementations are within the scope of the claims.

What is claimed is:

1. A busway joint comprising:
a first base portion comprising: a first exterior side, and a first interior side, wherein the first base portion comprises a first pressure plate;
a second base portion comprising: a second exterior side, and a second interior side that faces the first interior side, wherein the second base portion comprises a second pressure plate;
at least one electrically conductive assembly between the first interior side and the second interior side, wherein the at least one electrically conductive assembly comprises: a first electrical conductor; and a second electrical conductor separated from the first electrical conductor by a space; and
a securing assembly comprising:
a connection element that couples the first base portion and the second base portion, the connection element comprising a body that comprises a first end to a second end, wherein the first end is on the first exterior side of the first base portion and the second end is on the second exterior side of the second base portion, and the body extends through a center of the busway joint;
a cam assembly on the first end of the connection element and on the first exterior side of the first base portion, the cam assembly comprising a cam body configured for rotation between a released position and a closed position;
a locking element on the second end of the body; and
a spring element between the locking element and the second exterior side, wherein rotating the cam body between the released position and the closed position changes an extent of the space.

2. The busway joint of claim 1, wherein the connection element comprises a bolt, the bolt comprising a bolt head and a bolt body that extends from the bolt head; and
wherein the cam body is attached to the bolt head at a rotation mount, the bolt body extends through the busway joint, and the locking element and the spring element are mounted on the bolt body.

3. The busway joint of claim 2, further comprising: a first washer between the cam body and the first exterior side; and a second washer between the spring element and the second exterior side.

4. The busway joint of claim 3, wherein the first washer is a first deflectable disk washer, and the second washer is a second deflectable disk washer.

5. The busway joint of claim 4, wherein the cam body comprises a curved perimeter portion configured to contact and deform the first deflectable disk washer when the cam body rotates between the released position and the closed position.

6. The busway joint of claim 1, wherein rotating the cam body from the released position to the closed position compresses the spring element and reduces the extent of the space; and rotating the cam body from the closed position to the released position allows the spring element to expand and increases the extent of the space.

7. The busway joint of claim 1, wherein the spring element comprises a coil spring that surrounds the connection element.

8. The busway joint of claim 1, wherein the cam assembly further comprises an operating interface attached to the cam body, and wherein the cam body is configured to rotate between the released position and the closed position in response to manipulation of the operating interface.

9. The busway joint of claim 8, wherein the operating interface comprises a handle configured for manual manipulation without the use of tools.

10. A system comprising:

a busway portion comprising:

a busway housing comprising a first end and a second end; and one or more busway electrical conductors mounted to the busway housing, each of the busway electrical conductors extending from the first end of the busway housing and from the second end of the busway housing;

a busway joint comprising:

a first base portion comprising: a first exterior side, and a first interior side, wherein the first base portion comprises a first pressure plate;

a second base portion comprising: a second exterior side, and a second interior side that faces the first interior side, wherein the second base portion comprises a second pressure plate;

at least one electrically conductive assembly comprising: a first joint electrical conductor; and a second joint electrical conductor separated from the first joint electrical conductor by a space, wherein the space is configured to receive one of the one or more busway electrical conductors; and a securing assembly comprising:

a connection element that comprises a body that passes through the busway joint, the body comprising a first end and a second end, wherein the first end is on the first exterior side of the first base portion and the second end is on the second exterior side of the second base portion;

a cam assembly on the first end of the connection element, the cam assembly comprising a cam body configured for rotation between a released position and a closed position;

a locking element on the second end of the connection element; and a spring element between the locking element and the second exterior side, wherein rotating the cam body between the released position and the closed position changes an extent of the space.

11. The system of claim 10, wherein the connection element of the busway joint comprises a bolt, the bolt comprising a bolt head and a bolt body that extends from the bolt head; and wherein the cam body is attached to the bolt head at a rotation mount, the bolt body extends through the busway joint, and the locking element and the spring element are mounted on the bolt body.

12. The system of claim 11, wherein the busway joint further comprises: a first washer between the cam body and the first exterior side; and a second washer between the spring element and the second exterior side.

13. The system of claim 10, wherein rotating the cam body from the released position to the closed position compresses the spring element and reduces the extent of the space; and rotating the cam body from the closed position to the released position allows the spring element to expand and increases the extent of the space.

14. The system of claim 10, wherein the cam assembly further comprises an operating interface attached to the cam body, and wherein the cam body is configured to rotate between the released position and the closed position in response to manipulation of the operating interface.

15. A securing system for a busway joint, the securing system comprising:

a bolt comprising:

a bolt head; and a bolt body that extends from the bolt head through a center of a busway joint, the bolt body comprising a smooth exterior portion and a threaded end, the bolt body configured for insertion through the busway joint;

a cam assembly comprising:

a cam body mounted to the bolt head; and an operating interface on the cam body, the operating interface configured to rotate the cam body to apply a force to a first exterior side of the busway joint;

a spring element configured for mounting onto the smooth exterior portion of the bolt body; and a locking element configured for connection to the threaded end of the bolt body with the spring element between the locking element and a second exterior side of the busway joint.

16. The securing system of claim 15, wherein the cam body comprises a curved perimeter portion.

17. The securing system of claim 15, wherein the cam body comprises two identical lobes and the operating interface comprises a handle connected to the two identical lobes, the bolt body is centered between the two identical lobes, and the handle is configured to be rotated by hand and without the use of tools.

18. The securing system of claim 17, wherein each identical lobe has a curved perimeter portion.

19. The securing system of claim 15, wherein the spring element comprises a coil spring that surrounds the smooth exterior portion of the bolt body.

20. The securing system of claim 15, wherein the locking element comprises locking nut attached to the threaded end of the bolt body.

21. A busway joint comprising:

a first base portion comprising: a first exterior side, and a first interior side;

a second base portion comprising: a second exterior side, and a second interior side that faces the first interior side;

at least one electrically conductive assembly between the first interior side and the second interior side, wherein the at least one electrically conductive assembly comprises: a first electrical conductor; and a second electrical conductor separated from the first electrical conductor by a space;

a securing assembly comprising:

a connection element that couples the first base portion and the second base portion, wherein the connection element comprises a bolt, the bolt comprising a bolt head and a bolt body that extends from the bolt head;

a cam assembly at a first end of the connection element, the cam assembly comprising a cam body configured for rotation between a released position and a closed position;

a locking element, wherein the cam body is attached to the bolt head at a rotation mount, and the bolt body extends through the busway joint; and a spring element between the locking element and the second exterior side, wherein rotating the cam body between the released position and the closed position changes an extent of the space, and the locking element and the spring element are mounted on the bolt body; and a first washer between the cam body and the first exterior side; and a second washer between the spring element and the second exterior side.

22. A securing system for a busway joint, the securing system comprising:

a bolt comprising:

a bolt head; and a bolt body that extends from the bolt head, the bolt body comprising a smooth exterior portion and a threaded end, the bolt body configured for insertion through a busway joint;

a cam assembly comprising:

a cam body mounted to the bolt head; and an operating interface on the cam body, the operating interface configured to rotate the cam body to apply a force to a first exterior side of the busway joint;

a spring element configured for mounting onto the smooth exterior portion of the bolt body; and a locking element configured for connection to the threaded end of the bolt body with the spring element between the locking element and a second exterior side of the busway joint, wherein the cam body comprises two identical lobes and the operating interface comprises a handle connected to the two identical lobes, the bolt body is centered between the two identical lobes, and the handle is configured to be rotated by hand and without the use of tools.

* * * * *